US010738703B2

(12) United States Patent
Schwarz et al.

(10) Patent No.: US 10,738,703 B2
(45) Date of Patent: Aug. 11, 2020

(54) INTERCOOLED COOLING AIR WITH COMBINED FEATURES (71) Applicant: United Technologies Corporation, Farmington, CT (US)

(72) Inventors: Frederick M. Schwarz, Glastonbury, CT (US); Nathan Snape, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 232 days.

(21) Appl. No.: 15/928,506

(22) Filed: Mar. 22, 2018

(65) Prior Publication Data
US 2019/0292985 A1 Sep. 26, 2019

(51) Int. Cl.
F02C 7/18 (2006.01)
F02C 6/08 (2006.01)
F04D 29/58 (2006.01)

(52) U.S. Cl.
CPC ............... F02C 7/185 (2013.01); F02C 6/08 (2013.01); F04D 29/5833 (2013.01);
(Continued)

(58) Field of Classification Search
CPC ...... F02C 7/185; F02C 6/08; F05D 2260/231; F05D 2260/213; F05D 2260/211; F05D 2260/323; F04D 29/5833
USPC .......................................................... 415/144
See application file for complete search history.

(56) References Cited

U.S. PATENT DOCUMENTS 2,692,476 A 10/1954 Schaal et al.
3,878,677 A 4/1975 Colvin
(Continued)

FOREIGN PATENT DOCUMENTS

DE 2852057 6/1979
EP 0447886 9/1991
(Continued)

OTHER PUBLICATIONS

The Extended European Search Report for EP Application No. 19164741.1, dated Jul. 23, 2019.
(Continued)

Primary Examiner — J. Todd Newton
(74) Attorney, Agent, or Firm — Carlson, Gaskey & Olds, P.C.

(57) ABSTRACT

A gas turbine engine includes a plurality of rotating components housed within a main compressor section and a turbine section. A first tap is connected to the main compressor section and configured to deliver air at a first pressure. A heat exchanger is connected downstream of the first tap. A cooling air valve is configured to selectively block flow of cooling air across the heat exchanger. A cooling compressor is connected downstream of the heat exchanger. A shut off valve stops flow between the heat exchanger and the cooling compressor. A second tap is configured to deliver air at a second pressure which is higher than the first pressure. A mixing chamber is connected downstream of the cooling compressor and the second tap. The mixing chamber is configured to deliver air to at least one of the plurality of rotating components. A system stops flow between the cooling compressor and the plurality of rotating components. A controller is configured to modulate flow between the heat exchanger and the plurality of rotating components under certain power conditions of the gas turbine engine. The controller is programmed to control the cooling air valve, the shut off valve and the system such that flow is stopped between the heat exchanger and the cooling compressor only after the cooling compressor has been stopped.

20 Claims, 5 Drawing Sheets (52) U.S. Cl.
CPC .. *F05D 2220/323* (2013.01); *F05D 2260/211* (2013.01); *F05D 2260/213* (2013.01); *F05D 2260/231* (2013.01)

(56) References Cited

U.S. PATENT DOCUMENTS

| | | | |
|---|---|---|---|
| 4,254,618 A | 3/1981 | Elovic | |
| 4,539,945 A | 9/1985 | Bosisio | |
| 4,882,902 A | 11/1989 | Reigel et al. | |
| 5,056,335 A | 10/1991 | Renninger et al. | |
| 5,269,135 A | 12/1993 | Vermejan et al. | |
| 5,305,616 A | 4/1994 | Coffinberry | |
| 5,363,641 A * | 11/1994 | Dixon | F02C 6/08 60/226.1 |
| 5,392,614 A | 2/1995 | Coffinberry | |
| 5,414,992 A | 5/1995 | Glickstein | |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 5,967,461 A * | 10/1999 | Farrington | B64D 13/06 244/118.5 |
| 6,050,079 A | 4/2000 | Durgin et al. | |
| 6,065,282 A | 5/2000 | Fukue et al. | |
| 6,134,880 A * | 10/2000 | Yoshinaka | F02C 7/143 60/226.1 |
| 6,430,931 B1 | 8/2002 | Horner | |
| 6,487,863 B1 | 12/2002 | Chen et al. | |
| 6,612,114 B1 | 9/2003 | Klingels | |
| 6,892,523 B2 | 5/2005 | Fetescu et al. | |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bart et al. | |
| 7,698,884 B2 | 4/2010 | Maguire et al. | |
| 7,765,788 B2 | 8/2010 | Schwarz | |
| 7,823,389 B2 * | 11/2010 | Seitzer | F01D 11/24 60/782 |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 9,850,819 B2 | 12/2017 | Suciu et al. | |
| 9,856,793 B2 | 1/2018 | Zelesky et al. | |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0230651 A1 * | 9/2008 | Porte | B64D 13/06 244/118.5 |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 * | 8/2009 | Sengar | F01D 11/04 415/115 |
| 2009/0226297 A1 | 9/2009 | Yanagi et al. | |
| 2009/0272120 A1 | 11/2009 | Tiemann | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 * | 7/2013 | Lo | F02C 7/18 60/785 |
| 2013/0199156 A1 | 8/2013 | Ress, Jr. et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 * | 11/2014 | Fletcher | F02K 3/115 415/1 |
| 2014/0352315 A1 | 12/2014 | Diaz | |
| 2015/0114611 A1 | 4/2015 | Morris et al. | |
| 2015/0275769 A1 * | 10/2015 | Foutch | F02C 9/18 60/776 |
| 2015/0285147 A1 * | 10/2015 | Phillips | F01D 25/125 60/726 |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 | 1/2016 | Suciu et al. | |
| 2016/0131036 A1 | 5/2016 | Bintz et al. | |
| 2016/0131037 A1 * | 5/2016 | Spangler | F01D 5/085 60/806 |
| 2016/0169118 A1 | 6/2016 | Duong | |
| 2016/0215732 A1 | 7/2016 | Malecki | |
| 2016/0237901 A1 * | 8/2016 | Zelesky | F02K 3/115 |
| 2016/0237906 A1 * | 8/2016 | Suciu | F02C 7/18 |
| 2016/0312615 A1 | 10/2016 | Lyons | |
| 2016/0312797 A1 * | 10/2016 | Suciu | F01D 25/12 |
| 2016/0341125 A1 | 11/2016 | Kraft et al. | |
| 2016/0369697 A1 | 12/2016 | Schwarz et al. | |
| 2017/0009657 A1 * | 1/2017 | Schwarz | F02C 7/04 |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 * | 6/2017 | Merry | F01D 25/12 |
| 2017/0175632 A1 * | 6/2017 | Hanrahan | F02C 3/10 |
| 2017/0184027 A1 * | 6/2017 | Moniz | F02K 3/06 |

(56) References Cited

U.S. PATENT DOCUMENTS

2017/0204787 A1    7/2017  Duesler et al.
2017/0306794 A1*  10/2017  Schwarz ............... F28D 7/1623

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3109436 | 12/2016 |
| EP | 3121411 | 1/2017 |
| EP | 3296543 | 3/2018 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.

* cited by examiner

INTERCOOLED COOLING AIR WITH COMBINED FEATURES

BACKGROUND

This application relates to an intercooled cooling air supply system for cooling rotatable components in a gas turbine engine.

Gas turbine engines are known and typically include a fan delivering air into a bypass air as propulsion air. The fan also delivers air into a core engine where it enters a compressor section. The air is compressed and delivered into a combustion section where it is mixed with fuel and ignited. Products of this combustion pass downstream over turbine rotors causing them to rotate.

Modern gas turbine engines are operating at higher and higher compressor pressures and, hence, temperatures. Further, the turbine sections are being exposed to higher temperature and pressures.

It becomes important to adequately supply cooling air in an efficient manner to rotating components, such as found in the compressor or turbine sections.

SUMMARY

In a featured embodiment, a gas turbine engine includes a plurality of rotating components housed within a main compressor section and a turbine section. A first tap is connected to the main compressor section and configured to deliver air at a first pressure. A heat exchanger is connected downstream of the first tap. A cooling air valve is configured to selectively block flow of cooling air across the heat exchanger. A cooling compressor is connected downstream of the heat exchanger. A shut off valve stops flow between the heat exchanger and the cooling compressor. A second tap is configured to deliver air at a second pressure which is higher than the first pressure. A mixing chamber is connected downstream of the cooling compressor and the second tap. The mixing chamber is configured to deliver air to at least one of the plurality of rotating components. A system stops flow between the cooling compressor and the plurality of rotating components. A controller is configured to modulate flow between the heat exchanger and the plurality of rotating components under certain power conditions of the gas turbine engine. The controller is programmed to control the cooling air valve, the shut off valve and the system such that flow is stopped between the heat exchanger and the cooling compressor only after the cooling compressor has been stopped.

In another embodiment according to the previous embodiment, the system for stopping rotation of the cooling compressor includes a clutch.

In another embodiment according to any of the previous embodiments, the air downstream of the cooling compressor passes through struts in a diffuser downstream of the main compressor section.

In another embodiment according to any of the previous embodiments, the mixing chamber is radially inward of said struts.

In another embodiment according to any of the previous embodiments, a check valve is placed on the tap between the main compressor section and the heat exchanger.

In another embodiment according to any of the previous embodiments, the heat exchanger is received within a chamber defined between an outer core housing and an inner housing which is radially inward of a bypass duct.

In another embodiment according to any of the previous embodiments, the cooling air valve is positioned at an upstream end of said chamber.

In another embodiment according to any of the previous embodiments, the cooling air valve is positioned at a location downstream of said heat exchanger.

In another embodiment according to any of the previous embodiments, the mixing chamber is upstream of a turbine blade in said turbine section.

In another embodiment according to any of the previous embodiments, a cooling compressor pressure ratio of the air downstream of the cooling compressor, and upstream of the mixing chamber, compared to a pressure of air downstream of the downstream most location is selected to be greater than or equal to 1.02.

In another featured embodiment, a gas turbine engine includes a plurality of rotating components housed within a main compressor section and a turbine section. A first tap is connected to the main compressor section and configured to deliver air at a first pressure. A heat exchanger is connected downstream of the first tap. A cooling air valve is configured to selectively block flow of cooling air across the heat exchanger. A cooling compressor is connected downstream of the heat exchanger. A means for stopping flow between the heat exchanger and the cooling compressor is provided. A second tap is configured to deliver air at a second pressure which is higher than the first pressure. A mixing chamber is connected downstream of the cooling compressor and the second tap. The mixing chamber is configured to deliver air to at least one of the plurality of rotating components. A means for stopping flow between the cooling compressor and the plurality of rotating components is provided. A controller is configured to modulate flow between the heat exchanger and the plurality of rotating components under certain power conditions of the gas turbine engine. The controller is programmed such that flow is stopped between the heat exchanger and the cooling compressor only after the cooling compressor has been stopped.

In another embodiment according to the previous embodiment, the means for stopping flow between the cooling compressor and the plurality of rotating components includes a clutch.

In another embodiment according to any of the previous embodiments, the means for stopping flow between the heat exchanger and the cooling compressor includes a shut off valve.

In another embodiment according to any of the previous embodiments, the means for stopping flow between the heat exchanger and the cooling compressor includes a shut off valve.

In another embodiment according to any of the previous embodiments, the air downstream of the cooling compressor passes through struts in a diffuser downstream of said main compressor section.

In another embodiment according to any of the previous embodiments, a check valve is placed on the first tap between the main compressor section and the heat exchanger.

In another embodiment according to any of the previous embodiments, the heat exchanger is received within a chamber defined between an outer core housing and an inner housing which is radially inward of a bypass duct.

In another embodiment according to any of the previous embodiments, the cooling air valve is positioned at an upstream end of the chamber.

In another embodiment according to any of the previous embodiments, the cooling air valve is positioned at a location downstream of the heat exchanger.

In another embodiment according to any of the previous embodiments, a cooling compressor pressure ratio of the air downstream of the cooling compressor, and upstream of said mixing chamber, compared to a pressure of air downstream of the downstream most location is selected to be greater than or equal to 1.02.

These and other features may be best understood from the following drawings and specification.

DETAILED DESCRIPTION

Figure 1:
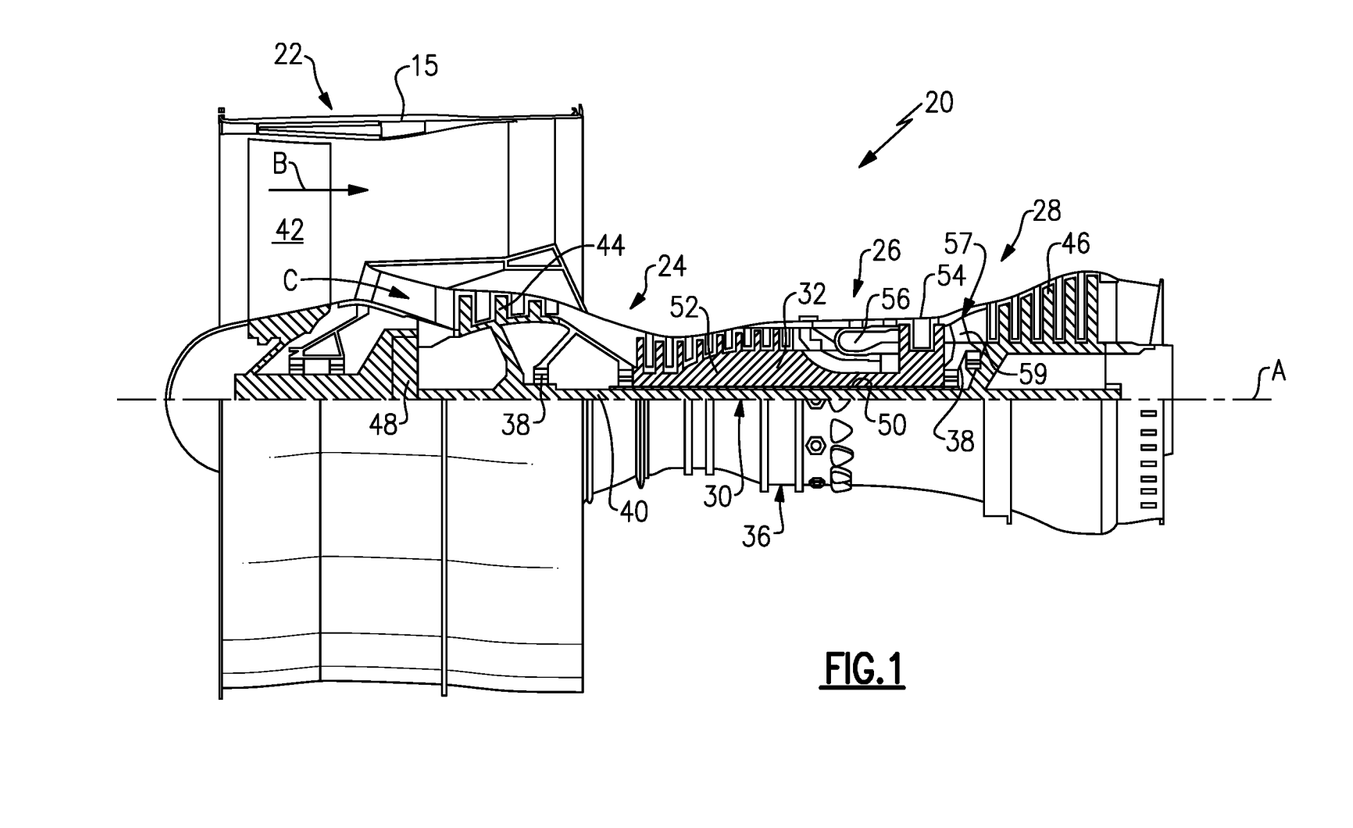
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

A commercial gas turbine engine, as illustrated in FIG. 1, may benefit from the following features of this disclosure. The FIG. 1 engines could be said to be designed to operate subsonically with an overall pressure ratio at the exit of the compressor divided by the inlet pressure at the entrance to the fan blade of greater than 40 at an 86 deg F. day at sea level take off operation. The intercooled cooling system as disclosed below may also provide benefits in other type gas turbine engines, such as direct drive engine where the fan is directly driven by a turbine and connecting shaft and engines utilized for military aircraft where the overall pressure ratio is above 40 during supersonic operation.

Figure 2A:
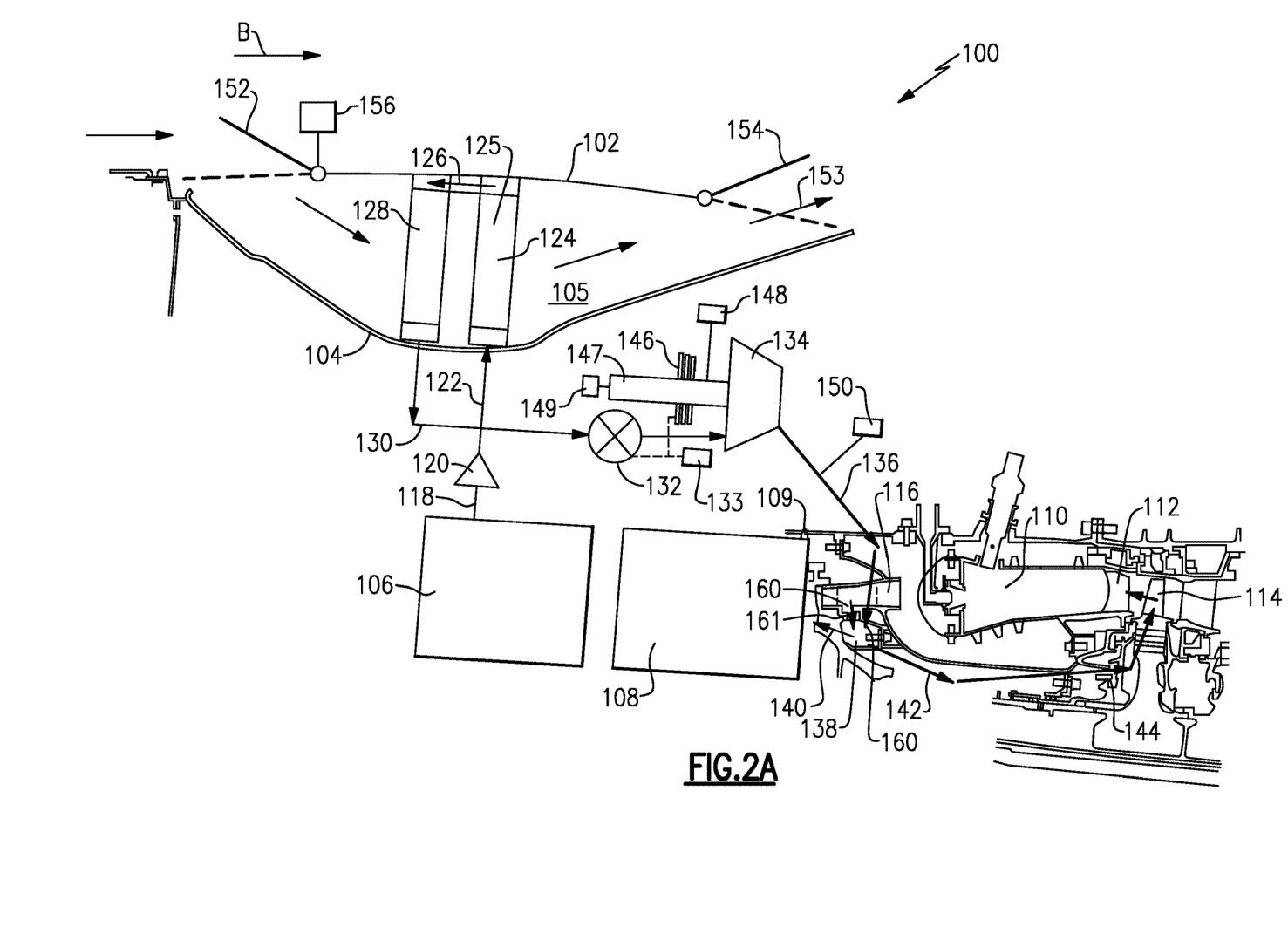
FIG. 2A shows an intercooled cooling system which may be utilized in the FIG. 1 gas turbine engine.

FIG. 2A shows an intercooled cooling system 100. A core engine housing 102 is defined inwardly of the bypass duct receiving bypass air B and outwardly of the compressor section. An inner housing 104 is also outwardly of a low pressure compressor 106 and a high pressure compressor 108. An intermediate chamber 105 is defined between the housings 102 and 104.

A downstream most point 109 in the high pressure compressor 108 defines a location where a pressure at, or about the highest pressure compressed air to be seen in the core of the engine. Further, air downstream of the point 109 is at about the highest temperature (known as $T_3$), and may also surround a combustor 110.

As shown at 116, a diffuser is downstream of the high pressure compressor 108.

Cooling air from the intercooled cooling system 100 may cool a first turbine vane row 112 and a first turbine blade row 114 of a high pressure turbine. In addition, or alternatively, the air may also cool a downstream most disk and hub in the high pressure compressor 108.

Air is tapped as shown at 118 from a location which is upstream of the downstream most location 109. In the illustrated embodiment, the air 118 is tapped from the low pressure compressor 106. However, it may also be tapped at more downstream locations in the low pressure compressor 106, or at locations within the high pressure compressor 108, which are upstream of the downstream most location 109.

A check valve 120 ensures that air flowing from the tap 118 will only pass into a passage 122 and will not return into the compressor 106. Air downstream of the passage 122 passes into a heat exchanger 124 having a first leg 125 extending to a crossing portion 126. That air is then passed into a return leg 128 extending back inwardly through the housing 104 to a line 130.

While the heat exchanger 124 is shown schematically, it should be understood that a plurality of heat exchange enhancing features such as fins, etc. may be utilized on the outer surface of the heat exchanger 124 to increase the heat transfer. In addition, a plurality of legs 125/128 may be utilized with a single return manifold 126. As can be seen, the radially outwardly extending upstream leg 125 is located within the chamber 105 to be downstream of the return or downstream leg 128. In this manner, the air in leg 128, which is cooler than the air in leg 125, is cooled before the cooling air encounters the higher temperature air in the leg 125. It should be understood that the arrangement shown for this heat exchanger is a space saving arrangement which might facilitate packaging of an otherwise very large pneumatic system in the core. Other heat exchanger arrangements can be employed.

Air downstream of the passage 130 passes through a shut off valve 132. The air downstream of the valve 132 passes to a cooling compressor 134. The air downstream of the cooling compressor 134 passes into passages 136, and through structural struts 160, which are circumferentially spaced and may be upstream in the diffuser 116.

The air having passed through the strut 160 enters a mixing chamber 138 radially inward of diffuser 116. The mixing chamber 138 mixes this air from a plurality of taps 161, which tap air downstream of the downstream most location 109 into the mixing chamber 138. In this manner, air from the tap 118 mixes with air from the taps or holes 161.

In embodiments, air downstream of the mixing chamber 138 then passes into passages 142 and through a tangential on-board injector (TOBI) 144, and then to the blades 114 and the vanes 112.

The air can also cool the hub and disk of the high pressure compressor.

As further shown, a clutch 146 alternatively connects a drive input 149 through a shaft 147 to selectively drive the cooling compressor 134. Input 149 may be a mechanical power take off shaft, an electric or hydraulic motor, or any number of other drives.

One feature of this disclosure is that the intercooled cooling air passing through the cooling compressor 134 is only utilized at higher power operation for an associated gas turbine engine. As an example, the compressor 134 may not be operational during idle, at the end of climb or during cruise operation of the associated gas turbine engine. However, at takeoff and initial climb, the cooling compressor 134 may be utilized to supplement the cooling air provided to the turbine section 112/114 and/or rear sections of the high pressure compressor 108. The air is shown passing at 140 to selectively cool the downstream most portion of the high pressure compressor 108 and, in particular, its hub and disk.

Stated generically, it could be said that the engine associated with the intercooled cooling system 100 includes a plurality of rotatable components within a housing, with the plurality of rotatable components including at least a high pressure compressor and a high pressure turbine, and the cooling air is directed to at least one of the rotatable components. In embodiments, it may be the high pressure compressor, the high pressure turbine, or both.

The associated clutch 146 is opened by a control 133 to stop rotation of the cooling compressor 134 under conditions as described above. The control will also control the shut off valve 132. The timing of closing off the shut off valve 132 and opening the clutch 146 is such that the clutch 146 is opened such that power input to the compressor 134 substantially stops before the valve 132 is substantially closed to block further airflow. Alternatively, rather than a clutch the drive 149 may be otherwise substantially unpowered. Other shut off controls to depower the compressor 134 from compressing air may be used.

A cooling air valve 152 is associated with the control 133 and is operable to open or close thereby reducing or eliminating cooling air flowing across the heat exchanger 124. Generally, at lower power operation, the valve 152 is closed to improve engine efficiency and to decrease the amount of bypass flow diverted through a chamber 105 where such diverted flow represents an inefficiency by reducing engine thrust. This airflow is shown at 153 being delivered back into the bypass airflow.

An alternative location 154 is shown for the cooling air valve downstream of the upstream end of chamber 105. Such an arrangement may be utilized with a flush scoop inlet in the location where valve 152 is illustrated. Another alternative to be incorporated with either a flush scoop or raised (see FIG. 2D; and below) at the location of 152 is to incorporate a valve somewhat in front of the face of the heat exchanger.

An appropriate monitoring system may be utilized such as shown at 156, which ensures the valve is open when cooling airflow is desired. A monitoring system 148 to ensures the clutch 146 is open when desired and closed when desired. In addition, a monitoring system 150 ensures that the compressed air at line 136 has a temperature and pressure as desired.

While 118/122/130 and 136 are shown as simple lines it should be understood they are fluid conduits.

The cooling compressor may be designed such that air downstream is at a pressure ratio slightly greater than that downstream of downstream point 109. As an example, the pressure ratio may be greater than 1.02 of that downstream of point 109, and in other examples greater than 1.05. Also, the mixing chamber has no movable part, such that when a design flow is introduced via the flow passages represented by 136 that flow is potentially supplemented by a flow from 160 or lost to 160 if an oversupply of air relative to what all passages downstream of the mixing chamber can receive is provided.

By locating the heat exchanger 124 in the recessed chamber 105, fuel consumption efficiency is achieved by not blocking the flow of air through the bypass duct in particular when the cooled cooling air system is not in use.

Figure 2B:
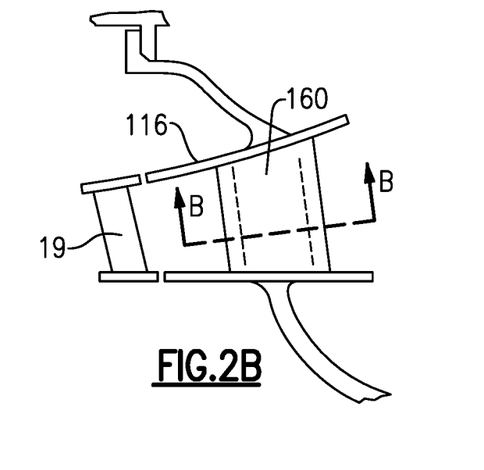
FIG. 2B shows a detail of the FIG. 2A system.

FIG. 2B shows a detail. Vanes 19 are downstream of a high pressure compressor. Struts 160 are positioned within the diffuser 116. The airflow is through the diffuser, and in particular the struts 160, as mentioned above.

Figure 2C:
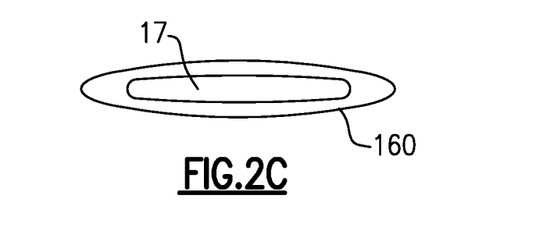
FIG. 2C is a cross-sectional line along line B-B of FIG. 2B.

As shown in FIG. 2C the struts 160 have a central hollow core 17 that provides a flow passage.

Figure 2D:
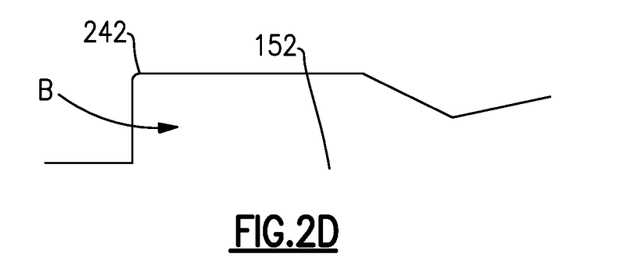
FIG. 2D shows an alternative.

FIG. 2D shows a scoop inlet 242 which may be utilized with the alternative location 154 of the cooling air valve.

Figure 3:
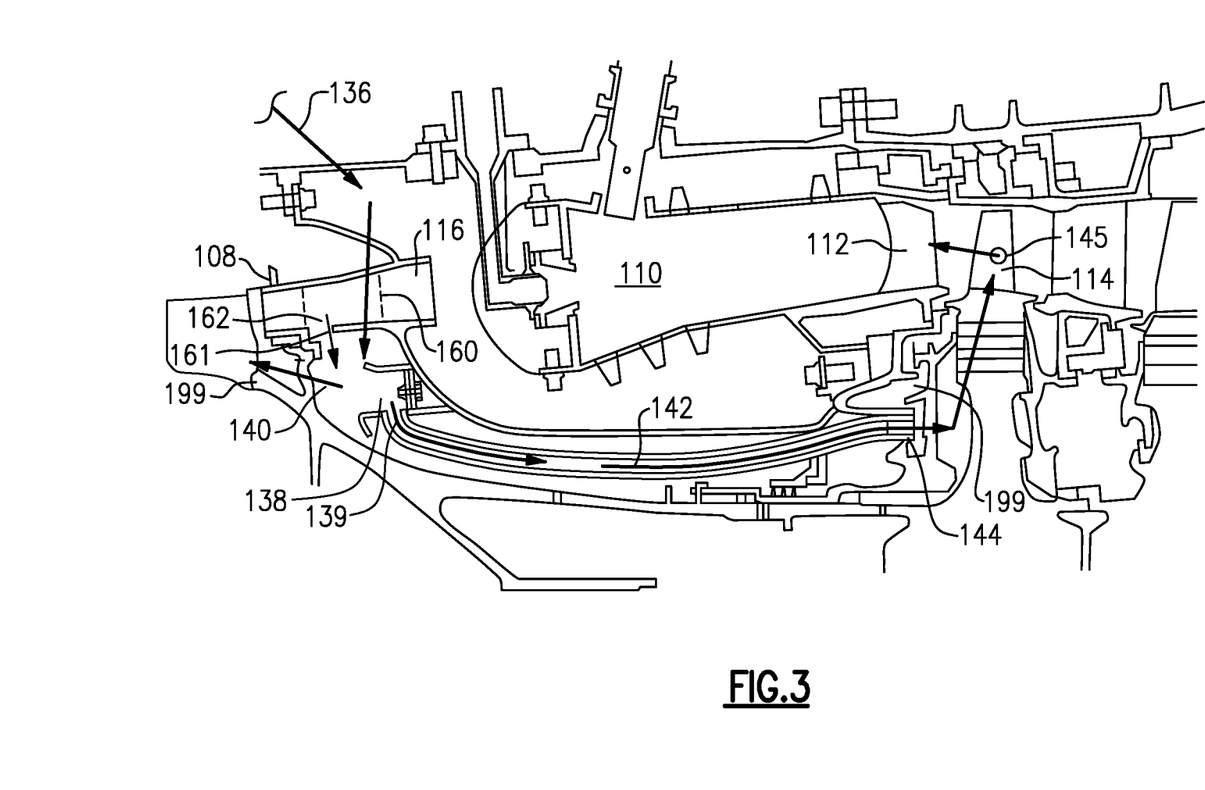
FIG. 3 shows a detail of the FIG. 2 embodiment.

FIG. 3 shows details of the FIG. 2A embodiment. The blade 114 is shown as having showerhead openings 145 to deliver the cooling air to the immediate front of the blade and along the blade's concave side where the hot gases leaving the vane 112 have a maximum scrubbing effect on the surface. The cooling airflow is also shown being delivered both to the front side of the disk 199 such that the cavity there is purged with cooling air and flow recirculation of very hot gases from the turbine gaspath between the vane 112 and blade 114 is reduced in temperature to an acceptable level Passages at 139 from the mixing chamber 138 allow the air to enter tubes, or a circumferentially extending chamber 142.

Figure 4:
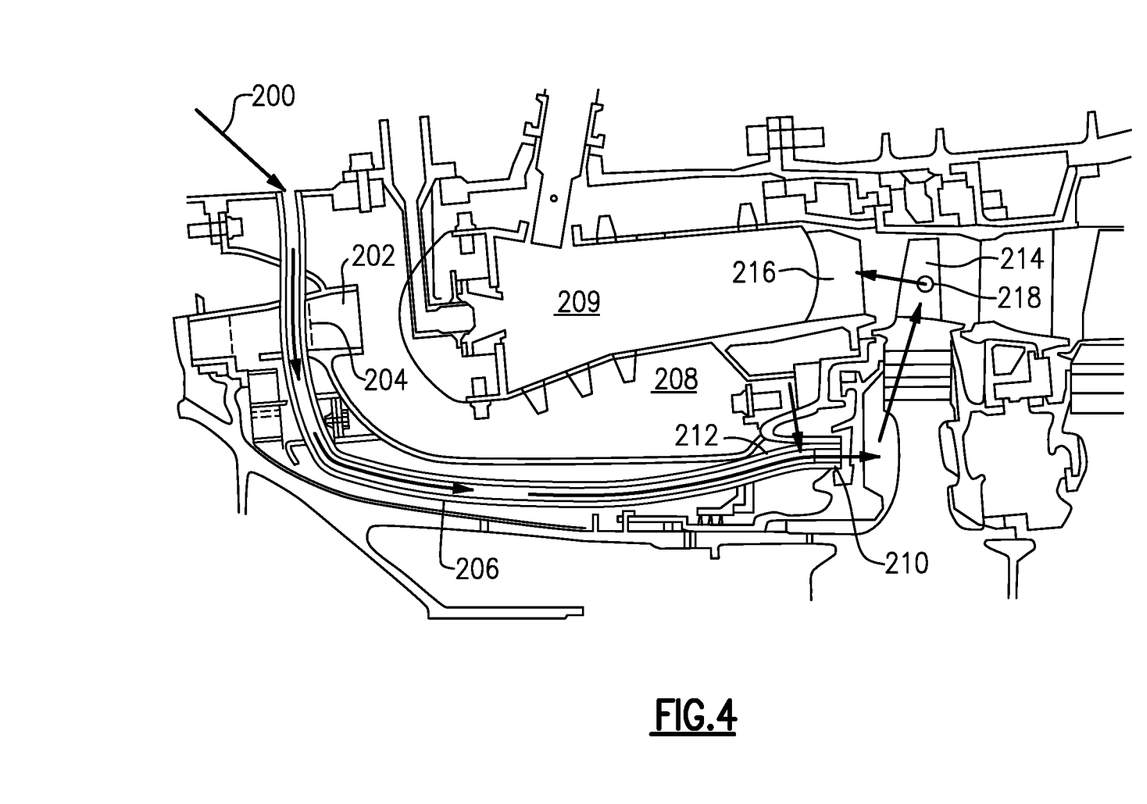
FIG. 4 shows a second embodiment.

FIG. 4 shows an alternative embodiment. In the alternative embodiment, the mixing chamber 138 is eliminated. Rather, the airflow 200 from the cooling compressor extends upstream of the diffuser 202 and through struts 204, and then to passages 206, passing to a TOBI 210. Prior to the TOBI 210, higher pressure air 212 from a rear section of the diffuser case at 208 surrounding the combustor 209 also passes to the blades 214 and vane 216 in another mixing chamber. Here again, showerhead cooling openings 218 deliver the air. The cooling compressor may be controlled as in the above embodiment.

As with the earlier embodiment, similar pressure ratios are achieved.

The control 133 may be part of a FADEC for the entire engine, or a stand-alone control programmed as appropriate.

This application could be summarized as disclosing a gas turbine engine including a plurality of rotating components housed within a main compressor section and a turbine section. A first tap is connected to the main compressor section and is configured to deliver air at a first pressure. A heat exchanger is connected downstream of the first tap. A cooling air valve is configured to selectively block flow of cooling air across the heat exchanger. A cooling compressor is connected downstream of the heat exchanger. A means for stopping flow between the heat exchanger and the cooling compressor is provided. A second tap is configured to deliver air at a second pressure which is higher than said first pressure. A mixing chamber is connected downstream of the cooling compressor and the second tap. The mixing chamber is configured to deliver air to at least one of the plurality of rotating components. A means for stopping flow between the cooling compressor and the plurality of rotating components is provided. A controller is configured to modulate flow between the heat exchanger and the plurality of rotating components under certain power conditions of the gas turbine engine. The controller is programmed such that flow is stopped between the heat exchanger and the cooling compressor only after the cooling compressor has been stopped.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
    a plurality of rotating components housed within a main compressor section and a turbine section;
    a first tap connected to said main compressor section and configured to deliver air at a first pressure;
    a heat exchanger connected downstream of said first tap;
    a cooling air valve configured to selectively block flow of cooling air across the heat exchanger;
    a cooling compressor connected downstream of said heat exchanger, a drive for said cooling compressor;
    a shut off valve for stopping flow between the heat exchanger and the cooling compressor;
    a second tap configured to deliver air at a second pressure which is higher than said first pressure;
    a mixing chamber connected downstream of said cooling compressor and said second tap, wherein said mixing chamber is configured to deliver air to at least one of said plurality of rotating components; and
    a controller configured to modulate flow between the heat exchanger and the plurality of rotating components under certain power conditions of the gas turbine engine, said controller programmed to control said cooling air valve, said shut off valve and said drive for said cooling compressor such that flow is stopped between the heat exchanger and the cooling compressor only after the cooling compressor has been stopped.

2. The gas turbine engine as set forth in claim 1, wherein said drive including a clutch opened by said controller for stopping rotation of said cooling compressor.

3. The gas turbine engine as set forth in claim 1, wherein the air downstream of the cooling compressor passes through struts in a diffuser downstream of said main compressor section.

4. The gas turbine engine as set forth in claim 3, wherein said mixing chamber is radially inward of said struts.

5. The gas turbine engine as set forth in claim 1, wherein a check valve is placed on said tap between said main compressor section and said heat exchanger.

6. The gas turbine engine as set forth in claim 1, wherein said heat exchanger is received within a chamber defined between an outer core housing and an inner housing which is radially inward of a bypass duct.

7. The gas turbine engine as set forth in claim 6, wherein said cooling air valve is positioned at an upstream end of said chamber.

8. The gas turbine engine as set forth in claim 6, wherein said cooling air valve is positioned at a location downstream of said heat exchanger.

9. The gas turbine engine as set forth in claim 1, wherein said mixing chamber is upstream of a turbine blade in said turbine section.

10. The gas turbine engine as set forth in claim 1, wherein a cooling compressor pressure ratio of the air downstream of said cooling compressor, and upstream of said mixing chamber, compared to a pressure of air downstream of said downstream most location is selected to be greater than or equal to 1.02.

11. A gas turbine engine comprising:
a plurality of rotating components housed within a main compressor section and a turbine section;
a first tap connected to said main compressor section and configured to deliver air at a first pressure;
a heat exchanger connected downstream of said first tap;
a cooling air valve configured to selectively block flow of cooling air across the heat exchanger;
a cooling compressor connected downstream of said heat exchanger;
means for stopping flow between the heat exchanger and the cooling compressor;
a second tap configured to deliver air at a second pressure which is higher than said first pressure;
a mixing chamber connected downstream of said cooling compressor and said second tap, wherein said mixing chamber is configured to deliver air to at least one of said plurality of rotating components;
means for stopping flow between the cooling compressor and the plurality of rotating components; and
a controller configured to modulate flow between the heat exchanger and the plurality of rotating components under certain power conditions of the gas turbine engine, said controller programmed such that flow is stopped between the heat exchanger and the cooling compressor only after the cooling compressor has been stopped.

12. The gas turbine engine as set forth in claim 11, wherein said means for stopping flow between said cooling compressor and the plurality of rotating components includes a clutch.

13. The gas turbine engine as set forth in claim 12, wherein said means for stopping flow between the heat exchanger and the cooling compressor includes a shut off valve.

14. The gas turbine engine as set forth in claim 11, wherein said means for stopping flow between the heat exchanger and the cooling compressor includes a shut off valve.

15. The gas turbine engine as set forth in claim 11, wherein the air downstream of the cooling compressor passes through struts in a diffuser downstream of said main compressor section.

16. The gas turbine engine as set forth in claim 11, wherein a check valve is placed on said first tap between said main compressor section and said heat exchanger.

17. The gas turbine engine as set forth in claim 11, wherein said heat exchanger is received within a chamber defined between an outer core housing and an inner housing which is radially inward of a bypass duct.

18. The gas turbine engine as set forth in claim 17, wherein said cooling air valve is positioned at an upstream end of said chamber.

19. The gas turbine engine as set forth in claim 17, wherein said cooling air valve is positioned at a location downstream of said heat exchanger.

20. The gas turbine engine as set forth in claim 11, wherein a cooling compressor pressure ratio of the air downstream of said cooling compressor, and upstream of said mixing chamber, compared to a pressure of air downstream of said downstream most location is selected to be greater than or equal to 1.02.

* * * * *